US010389020B2

(12) United States Patent
Fiala

(10) Patent No.: US 10,389,020 B2
(45) Date of Patent: Aug. 20, 2019

(54) SOLAR ELEMENT COMPRISING RESONATOR FOR APPLICATION IN ENERGETICS

(71) Applicant: VYSOKE UCENI TECHNICKE V BRNE, Brno (CZ)

(72) Inventor: Pavel Fiala, Brno (CZ)

(73) Assignee: VYSOKE UCENI TECHNICKE V BRNE, Brno (CZ)

( * ) Notice: Subject to any disclaimer, the term of this patent is extended or adjusted under 35 U.S.C. 154(b) by 115 days.

(21) Appl. No.: 15/342,885

(22) Filed: Nov. 3, 2016

(65) Prior Publication Data

US 2017/0077335 A1 Mar. 16, 2017

Related U.S. Application Data

(63) Continuation-in-part of application No. 14/427,898, filed as application No. PCT/CZ2012/000105 on Oct. (Continued)

(30) Foreign Application Priority Data

Jan. 27, 2011 (CZ) .................................... 2011-42
Sep. 14, 2012 (CZ) .................................. 2012-636

(51) Int. Cl.
*H01Q 1/44* (2006.01)
*H01L 31/02* (2006.01)
*H01Q 1/24* (2006.01)

(52) U.S. Cl.
CPC ............... *H01Q 1/44* (2013.01); *H01Q 1/248* (2013.01); *Y02E 10/52* (2013.01)

(58) Field of Classification Search
None
See application file for complete search history.

(56) References Cited

U.S. PATENT DOCUMENTS 7,688,279 B2   3/2010  Miyamoto et al.
2011/0156635 A1   6/2011  Hong et al.
(Continued)

FOREIGN PATENT DOCUMENTS

WO   2009/064736         5/2009
WO   2012/100758 A1      8/2012
WO   2014/040576 A2      3/2014

OTHER PUBLICATIONS

International Search Report issued in International Application No. PCT/CZ2011/000076, "A Photovoltaic Element with an Included Resonator," dated Apr. 16, 2012.
(Continued)

Primary Examiner — Eli S Mekhlin
(74) Attorney, Agent, or Firm — Thedford I. Hitaffer; Hitaffer & Hitaffer, PLLC

(57) ABSTRACT

A system for transforming solar electromagnetic radiation energy into electric energy comprises a dielectric structure permeable to an electromagnetic wave of solar electromagnetic radiation. The structure comprises plural layers having dielectric materials with minimum electromagnetic damping. An upper plane of a first layer comprises an incidence plane of the electromagnetic wave onto the structure. A first resonator has one part extending along the upper plane and another part extending within the first layer, and is tuned to a first frequency. The second layer is coupled to the first layer in the direction of propagation of the electromagnetic wave to receive at least a portion of the electromagnetic wave passing through the first layer. A second resonator has one part extending along a plane between the first and second layers and another part extending within the second layer, and is tuned to a second frequency different from the first frequency.

8 Claims, 9 Drawing Sheets

Related U.S. Application Data 22, 2012, now abandoned, application No. 15/342,885, which is a continuation-in-part of application No. 13/981,881, filed as application No. PCT/CZ2011/000076 on Aug. 3, 2011, now abandoned.

(56) References Cited

U.S. PATENT DOCUMENTS

| | | |
|---|---|---|
| 2012/0080073 A1 | 4/2012 | Kotter et al. |
| 2014/0202532 A9 | 7/2014 | Fiala |

OTHER PUBLICATIONS

International Preliminary Report on Patentability and Written Opinion issued in International Application No. PCT/CZ2011/000076, entitled "A Photovoltaic Element with an Included Resonator," Jul. 30, 2013.
"Electrical resistivity and conductivity," Wikipedia, https://en.wikipedia.org/wiki/Electrical_resistivity_and_conductivity, retrieved Oct. 13, 2015.
Fiala, et al, "Tuned Structures for Special THz Applications," Progress in Electromagnetics Research Symposium, Mar. 23-27, 2009, Beijing, China.
Fiala, et al., "Tuned Periodical Structures—Model, Experiments in THz Band Applied in Safety Application," PIERS Proceedings, Jul. 5-8, 2010, Cambridge, USA.
Fiala, et al., "Novel vibrational and solar energy harvesters," SPIE Newsroom, Jul. 27, 2011.
Kotter, et al., Theory and Manufacturing Processes of Solar Nanoantenna Electromagnetic Collectors, Journal of Solar Energy Engineering, Jan. 5, 2010, vol. 132, No. 1, ASME International, US.
Corkish, et al., "Efficiency of antenna solar collection," Proceedings of the 3rd World Conference on Photovoltaic Energy Conversion: Joint Conference of 13th PV Science & Engineering Conference, 30th IEEE PV Specialists Conference, 18th European PV Solar Energy Conference; Osaka International Congress Cent, May 18, 2003, vol. 3.
Osgood III, et al., "Nanoantenna-coupled MIM nanodiodes for efficient vis/nir energy conversion," Proceedings of SPIE, Sep. 13, 2007, vol. 6652.
Fiala, et al., "Energy harvesting circuit for sensor system power supply," May 5, 2011, vol. 8066.
Cloete, et al., "Ridged cavity backed slot antenna with dielectric loading." Electronics Letters, Mar. 2, 1989, vol. 25, No. 5.
Yang, et al., "Bandwidth enhancement of microstrip antennas with metamaterial bilayered substrates," Journal of Electromagnetic Waves and Applications, Dec. 2007, vol. 21, No. 15.
International Search Report issued in International Application No. PCT/CZ2012/000105, "A Solar Element Comprising Resonator for Application in Energetics," May 6, 2014.
Notification Concerning Transmittal of International Preliminary Report on Patentability for International Application No. PCT/CZ2012/000105, "A Solar Element Comprising Resonator for Application in Energetics," Mar. 26, 2015.
International Preliminary Report on Patentability and Written Opinion issued in International Application No. PCT/CZ2012/000105, "A Solar Element Comprising Resonator for Application in Energetics," Mar. 17, 2015.
"Diffusion," Wikipedia, https://en.wikipedia.org/wiki/Diffusion, retrieved Apr. 11, 2016.
"Dopant Activation," Wikipedia, https://en.wikipedia.org/wiki/Dopant_Activation, retrieved Apr. 11, 2016.
"Lift-off (microtechnology)," Wikipedia, https://en.wikipedia.org/wiki/Lift-off_(microtechnology), retrieved Apr. 11, 2016.
"Doping (semiconductor)," Wikipedia, https://en.wikipedia.org/wiki/Doping_(semiconductor), retrieved Apr. 11, 2016.
"Wavelength," Wikipedia, https://en.wikipedia.org/wiki/Wavelength, retrieved Apr. 11, 2016.
"Split-ring resonator," Wikipedia, https://en.wikipedia.org/wiki/Split-ring_resonator, retrieved Apr. 11, 2016.
Non-Final Office Action for U.S. Appl. No. 14/427,898, entitled "Photovoltaic Element With an Included Resonator," dated Dec. 9, 2015.
Final Office Action for U.S. Appl. No. 14/427,898, entitled "Photovoltaic Element With an Included Resonator," dated May 3, 2016.
Non-Final Office Action for U.S. Appl. No. 13/981,881, entitled "Photovoltaic Element With an Included Resonator," dated Apr. 10, 2015.
Final Office Action for U.S. Appl. No. 13/981,881, entitled "Photovoltaic Element With an Included Resonator," dated Nov. 18, 2015.
Non-Final Office Action for U.S. Appl. No. 13/981,881, entitled "Photovoltaic Element With an Included Resonator," dated Jun. 2, 2016.

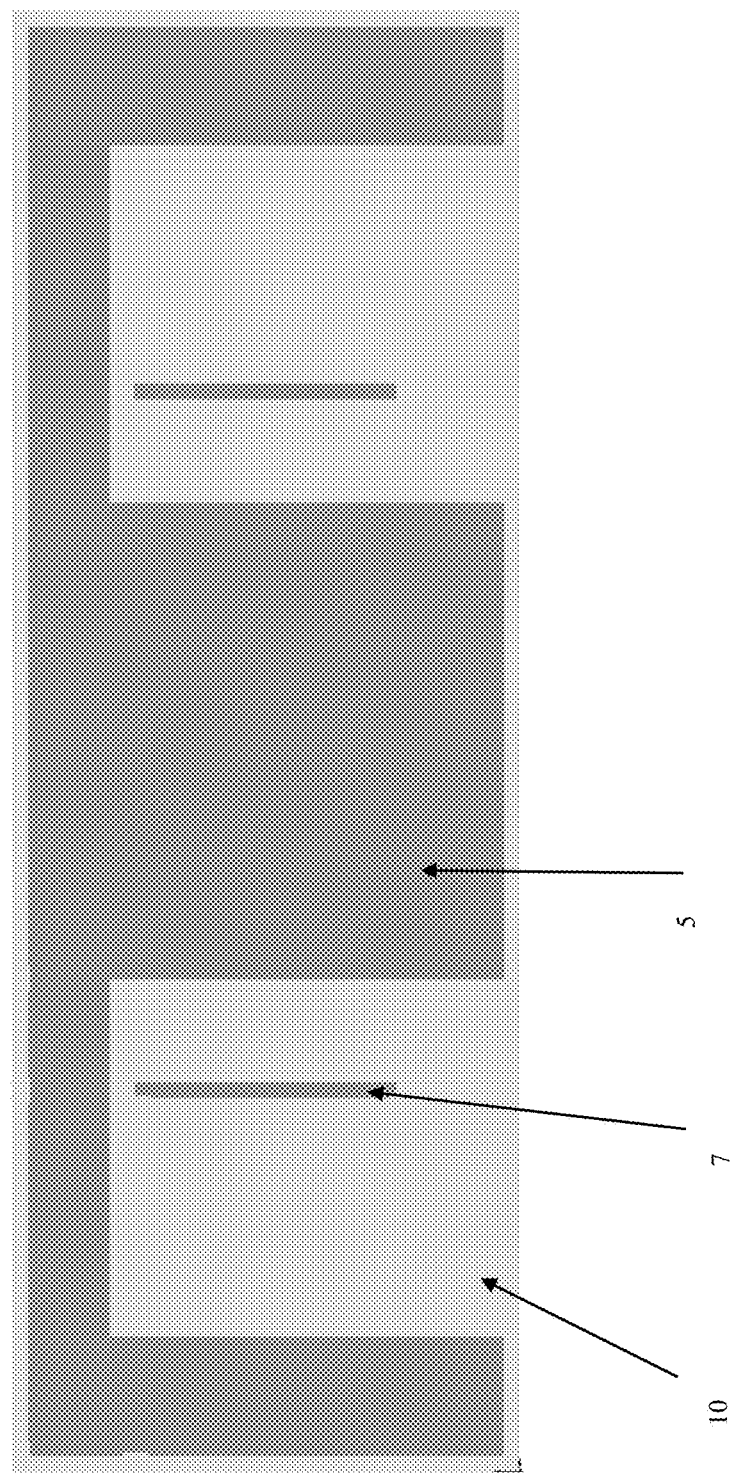

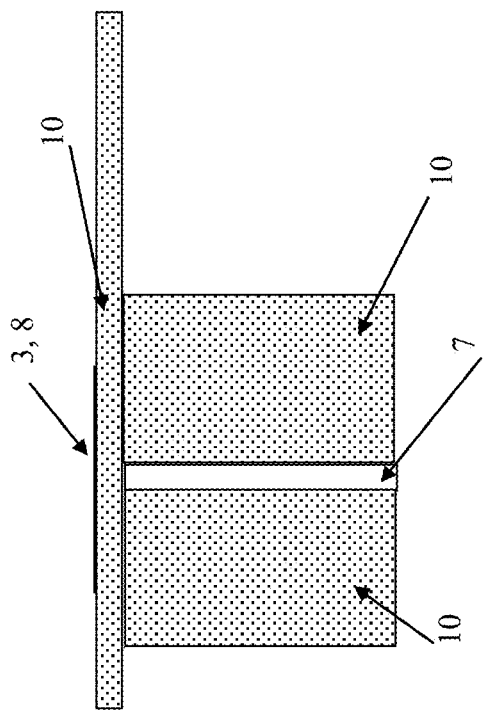
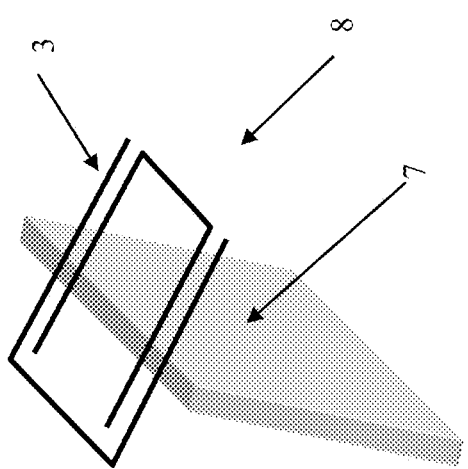
Fig. 6b
Fig. 6a

SOLAR ELEMENT COMPRISING RESONATOR FOR APPLICATION IN ENERGETICS

CROSS-REFERENCE TO RELATED APPLICATIONS

This application is a continuation in part of U.S. patent application Ser. No. 14/427,898, filed Mar. 12, 2015, now abandoned, which is a National Phase of International Application PCT/CZ2012/000105, filed Oct. 22, 2012, which claims priority to Czech Republic Patent Application No. 2012-636, filed Sep. 14, 2012, and U.S. patent application Ser. No. 13/981,881, filed Jul. 25, 2013, which is a National Phase of International Application PCT/CZ11/00076, filed Aug. 3, 2011, which claims priority to Czech Republic Patent Application No. 2011-42, filed Jan. 27, 2011, the disclosures of which are incorporated herein by reference.

BACKGROUND OF THE INVENTION

The invention relates to a system for transforming energy of solar electromagnetic radiation into electric energy characterized by a high transformation efficiency rate. The system includes a structure located between a pair of electrodes with the aim to utilize the element for high-efficiency transformation of the energy of light to electric energy.

In contemporary photovoltaics, more than fifty-year-old principles of transforming solar electromagnetic radiation or waves (wideband electromagnetic radiation within the wavelength range of 100 nm to 10000 nm) are generally applied. The solar cells are composed of two semiconductor layers (with silicon being the typical material) located between two metal electrodes. One of the layers (an N-type material) comprises a multitude of negatively charged electrons, whereas the other layer (a P-type material) exhibits a large number of "holes" definable as void spaces that easily accept electrons. The devices transforming electromagnetic waves to a lower-frequency electromagnetic wave, or a direct component, are known as transverters/converters. For this purpose, semiconductor structures with different concepts and types of architecture are applied, respecting only experimental results of the electromagnetic wave transformation effect.

Antennas, detectors, or structures designed to date are not tuned into resonance; the applied semiconductor structures face considerable difficulty in dealing with emerging stationary electromagnetic waves, and the efficiency of energy transformation has to be increased via additional measures.

Similar solutions utilize the principles of antennas or the transformation of a progressive electromagnetic wave to another type of electromagnetic radiation (namely a progressive electromagnetic wave having a different polarization or a stationary electromagnetic wave) and its subsequent processing. Certain problems occur in connection with the incident electromagnetic wave and its reflection as well as in relation to the broad-spectrum character of solar radiation. In general, it is not easy to construct an antenna capable of maintaining the designed characteristics in the wide spectrum for the period of several decades.

A solution has been proposed in which a single-layered system of tuned structures is applied to exploit the incident solar radiation; the system is based on a resonant mode semiconductor.

The patent application publication US20130312830 A1, the disclosure of which is incorporated herein by reference in its entirety and for any and all purposes as if fully set forth herein, provides a description of a photovoltaic element arranged on a semiconductor structure, said element including a resonator with a first planar and a second spatial part and arranged on a semiconductor structure. The structure is formed by a first layer with minimum electromagnetic damping, whose upper plane constitutes an incidence plane, and a second layer with electromagnetic damping. The at least one resonator is surrounded by a dielectric and arranged in the semiconductor structure. The area with electromagnetic damping borders on a relative electrode. The disadvantage of the solution consists in that the semiconducting substrate may overheat upon the incidence of an electromagnetic wave having high power density in the infrared radiation spectra A, B, C, and D. This problem then results in the reduction of operating life or even complete destruction of the element.

The following definitions were used in CZ20110042 and apply also in this document.

A dielectric is characterized in that its area includes moving charge carriers, whose number is nevertheless very low; these carriers move the resulting electric charge in the area of the dielectric. The area also includes such electric charge carriers or conditions which markedly restrict or, in a limited case, wholly impede the extent or degree of the motion and transfer of a free electric charge. These carriers or conditions are, from the electrical perspective, non-conductive in the given frequency bands of the applied electromagnetic wave; thus, there are no free electric charge carriers (or, if otherwise, they are found only at rates below 1% of the total concentration).

In a layer with minimum electromagnetic damping occurs a minimal decrease (of up to 10%) of the amplitude of the electromagnetic wave entering the specific volume of the material.

In a layer with electromagnetic damping, the amplitude of the progressive electromagnetic wave decreases by at least 10%.

The planar (here denoted as "first") part of a resonator is characterized by planar fabrication. In a technical embodiment, this is a fabricated resonator in which two dimensions markedly (at least tenfold) dominate over the third one.

The spatial (here denoted as "second") part of a resonator is characterized by non-planar fabrication. In a technical embodiment, this is a fabricated resonator in which two dimensions do not markedly (at least tenfold) dominate over the third one.

A reference electrode is an electrode to which an electrode of an identical character is connected from the external area; in the internal area, the electrode assumes the function of a relating electric field, and relative electric potential is created; in the direct component of an electromagnetic wave, an electric potential will appear to which other electric potentials in the given structure are related.

Dopant material is such material which, in the exemplary embodiment with an inorganic semiconductor, causes a higher concentration of electric charge carriers.

The patent application publication US2011156635 A1, the disclosure of which is incorporated herein by reference in its entirely and for any and all purposes as if fully set forth herein, discloses a reflected energy management apparatus and a method for resonance power transmission. Described herein are two resonators in separate structures; however, with no indication of presence of electromagnetic damping in a dielectric material.

SUMMARY OF THE INVENTION

This invention relates to a new architecture of a system for transforming energy of solar electromagnetic radiation into electric energy. Based on the utilized construction technology, the system resonates and produces high-value components of the electric and magnetic fields in such a manner that these components are utilizable and processable by means of well-known technology based on classical electronic elements.

This invention claims a system for transforming energy of solar electromagnetic radiation into electric energy, wherein the system comprises a dielectric structure, a first layer of the dielectric structure, a first resonator, a second layer of the dielectric structure and a second resonator.

The dielectric structure comprises a plurality of layers and is permeable to an electromagnetic wave of the solar electromagnetic radiation.

The first layer of the dielectric structure comprises a first dielectric material with minimum electromagnetic damping, and the upper plane of the first layer comprises an incidence plane of the electromagnetic wave onto the dielectric structure. The first dielectric material is based on ceramic materials of relative permittivity in the range of $\varepsilon=2-6$, e.g. N- or P-doped semiconductors, such as silicon, germanium or arsenic, and dielectric materials, such as aluminium oxide or silicon dioxide. The first dielectric material induces the damping of incident electromagnetic wave, i.e. the decrease of the amplitude of the wave, to a minimum extent (less than 10%).

The first resonator is tuned to a first resonance frequency and comprises two parts; a first part of the first resonator extends along the upper plane of the first layer of the dielectric structure, and a second part of the first resonator extends within the first layer of the dielectric structure. The second part of the resonator is inserted within the dielectric structure by techniques known in microelectronics and microchip manufacturing, e.g. lift-off, etching, photoresist etch-off, vapor deposition, or powder deposition.

The second layer of the dielectric structure is coupled to the first layer of the dielectric structure in the direction of propagation of the electromagnetic wave to receive at least a portion of the electromagnetic wave having passed through the first layer of the dielectric structure. The second layer of the dielectric structure comprises a second dielectric material with minimum electromagnetic damping. The second dielectric material can have the same structure than the first dielectric material, i.e. can be based on ceramic materials of relative permittivity in the range of $\varepsilon=2-6$, e.g. N- or P-doped semiconductors, such as silicon, germanium or arsenic, and dielectric materials, such as aluminium oxide or silicon dioxide. The second dielectric material induces the damping of incident electromagnetic wave, i.e. the decrease of the amplitude of the wave, to a minimum extent (less than 10%). The layered structure of the system is achieved by standard techniques of layering used in microelectronics, e.g. stacked die package technology.

The second layer of the dielectric structure comprises two parts; a first part of the second resonator extends along a plane between the first layer of the dielectric structure and the second layer of the dielectric structure, and a second part of the second resonator extends within the second layer of the dielectric structure. The second part of the resonator is inserted within the dielectric structure by techniques known in microelectronics and microchip manufacturing, e.g. lift-off, etching, photoresist etch-off, vapor deposition, or powder deposition. The second resonator is further tuned to a second resonance frequency different from the first resonance frequency. In preferred embodiments, the second resonance frequency is lower than the first resonance frequency.

In some embodiments, there is a plurality of second layers of the dielectric structure, each layer comprising a resonator with a different resonance frequency. In preferred embodiments, the resonance frequency of each resonator decreases in the direction of the propagating wave.

The last layer of the system induces the damping of electromagnetic wave and thus prevents the formation of a stationary wave. The electromagnetic damping in the last layer is achieved by either doping the dielectric material with a material of specific electric conductivity in the range of 1 µS/m to 10 S/m to form a P- or N-doped material (e.g. doping of silicon with boron or arsenic by diffusion technology, at the layer length of 10 µm and at specific electric conductivity of 4 S/m), or by depositing a thin layer (1-10 µm) of such material on the upper plane of the last-in-line second layer of dielectric structure, e.g. by chemical vapor or plasma deposition on an Al2O3-based layer. The technique of inducing the electromagnetic damping in the material can be powder deposition, vapor deposition, plasma enhanced chemical vapor deposition, or by diffusion technologies into the material of the layer.

In a preferred embodiment, the first part of the first resonator is comprised of a first pair of electrodes in the form of first coupled conductors arranged in the upper plane on top of the first layer of the dielectric structure. Simultaneously, the second part of the first resonator is comprised of a first reflector and a dielectric material of the first resonator, wherein the first reflector is surrounded by the dielectric material of the first resonator within the first layer of the dielectric structure. Preferably, the first reflector is arranged orthogonally to the upper plane of the first layer of the dielectric structure.

In another preferred embodiment, the first part of the second resonator is comprised of a second pair of electrodes in the form of second coupled conductors arranged in the plane between the first layer of the dielectric structure and the second layer of the dielectric structure. Simultaneously, the second part of the second resonator is comprised of a second reflector and a dielectric material of the second resonator, wherein the second reflector is surrounded by the dielectric material of the second resonator within the second layer of the dielectric structure. Preferably, the second reflector is arranged orthogonally to the plane between the first layer and the second layer of the dielectric structure.

In a preferred embodiment, the resonance frequency of the first resonator corresponds to a first region of high power spectral density (W/Hz) of the solar electromagnetic radiation, and the second resonance frequency of the second resonator corresponds to a second region of high power spectral density of the solar electromagnetic radiation.

The invention utilizes the spectrum of solar radiation in which the electromagnetic wave power flux density (W/m2) is high. Within the present invention, the system for transforming energy of solar electromagnetic radiation into electric energy comprising the first resonator arranged on the layered dielectric structure is, for the selected portion of the spectrum, tuned to the first resonance frequency $f_1$ of the incident electromagnetic wave. The system is tuned in such a manner that it focuses on areas exhibiting high values of power spectral density (such as the infrared radiation areas A, B, C, D). Simultaneously, the second resonator is tuned to the second resonance frequency $f_2$ of the selected region of the spectrum. The second resonator then follows the first resonator in the direction of propagation of the incident electromagnetic wave.

The tuning of resonators can be achieved in essentially two ways. The first option is to keep the same dielectric material of the resonator in each layer and to alter the planar and/or spatial parameters of the resonator. The second option is to keep the dimensions of the resonator(s) unchanged and to alter the dielectric material of the resonator in subsequent layers in terms of increasing the dielectric constant, e.g. the dielectric material of the first resonator can have the relative permittivity $\varepsilon=2.0$, the dielectric of the second resonator $\varepsilon=2.2$ and so forth.

The dielectric material of the resonator is a different dielectric than the one used in the first, or alternatively in the second dielectric material of the first, or the second layer. Nonetheless, the condition of the dielectric constant within the range of $\varepsilon=2-6$ is maintained. An example constitution of the first dielectric material is an N-doped silicon with parameters as a ceramic material, whereas the dielectric material of the first resonator(s) is e.g. aluminium oxide or silicon dioxide. A similar distinction applies to the second dielectric material and the dielectric material of the second resonator.

Through such inclusion of other resonators arranged in a plurality of second layers (even though theoretically an infinite number of resonators can be included, the real number remains within several hundreds of these elements), a set of resonators could be built depending on the geographical and climatic conditions. Therefore, it is possible to exploit the incident electromagnetic wave to acquire the maximum of energy for subsequent conversion into electric energy. In comparison with the currently applied solar and photovoltaic elements, the manufacturing technology and design of the resonators described herein provide for long operating life and allow high thermal differences. The concept realized within the described invention is characterized by top efficiency achieved in transforming the solar or thermal energy into electric energy.

One advantage of the newly constructed system consists in the manner of its composition, namely in the layered dielectric structure. This structure is formed by individual layers of the dielectric material, and each of these layers with dielectric properties comprises at least one resonator. This arrangement of the layered dielectric structure generates a minimum amplitude size and the phase of the backward electromagnetic wave propagating in the direction of the incident electromagnetic wave emitted by a source, such as the Sun. The system for transforming energy of solar electromagnetic radiation exploits the necessary portion of energy, and the actual layered dielectric structure will not heat up due to the effects caused by the incident or the incident and back-reflected electromagnetic wave. The resonators are designed in such a manner that the electromagnetic wave passing through the dielectric structure propagates further beyond the resonator to other layers with resonators and, at the end of the dielectric structure, into the free space or a solar system capable of harvesting the remaining energy in the form of residual heat, an electromagnetic wave, or light. Thus, the resonators behave like an ideal impedance-matched antenna or an ideal energy converter for the proposed wide and arbitrarily variable frequency spectrum.

The layered dielectric structure comprises several components described in the following section of the text. The first dielectric material with minimum electromagnetic damping is comprised in the first layer of the dielectric structure, wherein said layer is intended to harvest a portion (e.g. 20%) of the energy of the incident electromagnetic wave. Along the incidence plane of the first layer extends the first part of the first resonators. The second part of the first resonators extends within the first layer of the dielectric structure. These parts ensure optimal processing of the electromagnetic wave; the processing results in minimal reflection of the electromagnetic wave towards the first resonators. The rest of the energy is left to leave the area with minimum loss towards subsequent layers.

Beyond the first layer of the dielectric structure follows the second layer of the dielectric structure comprising the second dielectric material and is arranged in the direction of the propagation of electromagnetic wave, wherein said layer is intended to harvest another portion (e.g. 20% or other) of the energy of the incident electromagnetic wave. The second dielectric layer comprises the second resonator tuned to a second resonance frequency, different from the first resonance frequency. Providing that there is a plurality of second layers of dielectric structure and that each of the layers harvests, e.g. 20% of the energy, the number of layers needed to harvest the energy of the electromagnetic wave is 5—one first layer and four second layers, each comprising a resonator having a different resonance frequency.

The system can be then terminated by the last layer of the dielectric structure and the electromagnetic wave leaves the system into free space. Alternatively, the last layer of the system may comprise a component of a solar system which transforms or otherwise exploits the rest of the electromagnetic wave energy by converting it into another form of energy, e.g. heat, light or electricity.

Importantly, the designed system for transforming energy of solar electromagnetic radiation into electric energy does not utilize the material to generate electric charge, but rather uses the structure to set suitable conditions for the incidence of electromagnetic wave and its transformation to a stationary form of electromagnetic field.

Due to composition of selectively tuned periodical structure on layers within the system, the system exploits with maximum efficiency the incident energy in the form of an electromagnetic wave according to its representation in the frequency spectrum (spectral power density distribution) of the wave. This enables us—in comparison with resonators not modified as described above—to comprise and exploit the desired frequency spectrum of the incident electromagnetic wave using a markedly lower number of tuned structures in the system.

Based on the present invention, the described solution allows the adaptation of individual layers of dielectric structure arranged in the resulting system to spectral power density conditions of the incident electromagnetic radiation as present at a concrete location where the system is applied. Consequently, it is possible to harvest the maximum of incident electromagnetic radiation and to profit from the change of radiation to the required form of energy that facilitates further application (for example, as an electric energy source or generator). The designed systems for transforming energy of solar electromagnetic radiation are embedded in panels which, when interconnected, create photovoltaic (solar) fields.

A significant advantage of the introduced solution lies in the fact that the construction of the system enables us to set up optimal variants of the solar system according to the climatic conditions or solar activity. While one of the systems for transforming energy containing several layers of dielectric structures comprising resonators can be tuned to one set of resonance frequencies corresponding to a given power spectral density, another structure of the system can be tuned to a different set of resonance frequencies corresponding to a given power spectral density. The structures are arranged one after another in the direction of the electromagnetic wave progressing from the source. Therefore, it is possible—for a given geographical area, solar activities, or electromagnetic wave source—to set a system facilitating maximum exploitation of the electromagnetic wave as a form of incident energy.

The thus composed systems for transforming energy of solar electromagnetic radiation into electric energy can be manufactured or assembled in a factory or can be set up directly at the proposed location from a supplied kit.

Various advantages of this invention will become apparent to those skilled in the art from the following detailed description of the preferred embodiment, when read in light of the accompanying drawings.

BRIEF DESCRIPTION OF THE DRAWINGS

The principle of the invention will be clarified through the use of drawings, where:

FIG. 5 is a view from the direction of the incidence of the electromagnetic wave on the first part of the resonator and indicates the spatial arrangement of the second part of the resonator within the layer of dielectric structure as well as the position of the reflector within the layer of dielectric structure;

FIG. 6a illustrates an axonometric view of the resonator (formed by the reflector) above which the dielectric material and the coupled conductors are arranged;

FIG. 6b shows a lateral view of the resonator;

DETAILED DESCRIPTION OF THE PREFERRED EMBODIMENT

The principle of the construction of a system for transforming energy of solar electromagnetic radiation into electric energy will be clarified by, but not limited to the examples provided below.

Figure 1:
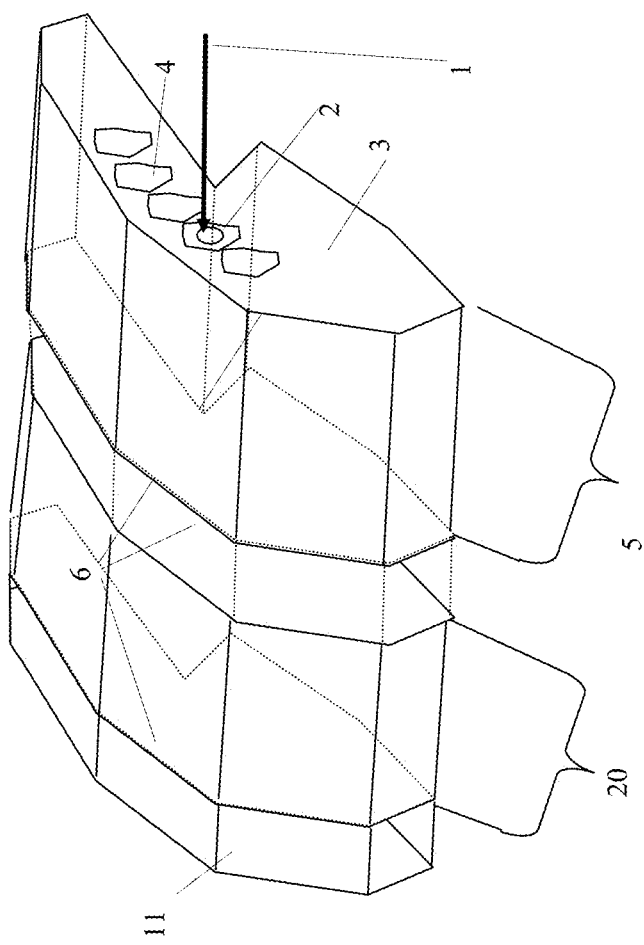
FIG. 1 shows the basic arrangement and configuration of the system for transforming energy of solar electromagnetic radiation into electric energy.

The basic embodiment of the system, including a layered dielectric structure, is provided in FIG. 1. This structure is formed by the first layer 5 of the dielectric structure comprising a first dielectric material with minimum electromagnetic damping and a periodical structure of resonators 4, exhibiting a first resonance frequency $f_1$, and by second layer 20 of the dielectric structure comprising a second dielectric material with minimum electromagnetic damping and a periodical structure of resonators 4, exhibiting a second resonance frequency $f_2$. The proposed periodical structure allows to operate in the resonance mode for frequencies f with the change Δf, while the parameter of Δf/f is within the interval of 0.5 to 1.5. Furthermore, the layer 5 includes at least one first resonator 4, wherein the first part 4a of the first resonator 4 extends along the incidence plane 3 of the first layer 5, and the second part 4b of the first resonator 4 extends within the first layer 5. After the first layer 5 in the direction of propagation of the electromagnetic wave through the dielectric structure, there is the second layer 20 of the dielectric structure exhibiting a second resonance frequency of the second resonator 4. The second layer 20 can represent one layer or a plurality of layers. Following the second layer 20, there is the last layer 11 of the dielectric structure comprising the last dielectric material with electromagnetic damping. The last layer 11 is optional and can be removed so that the layer 20 is followed by free space.

Figure 4:
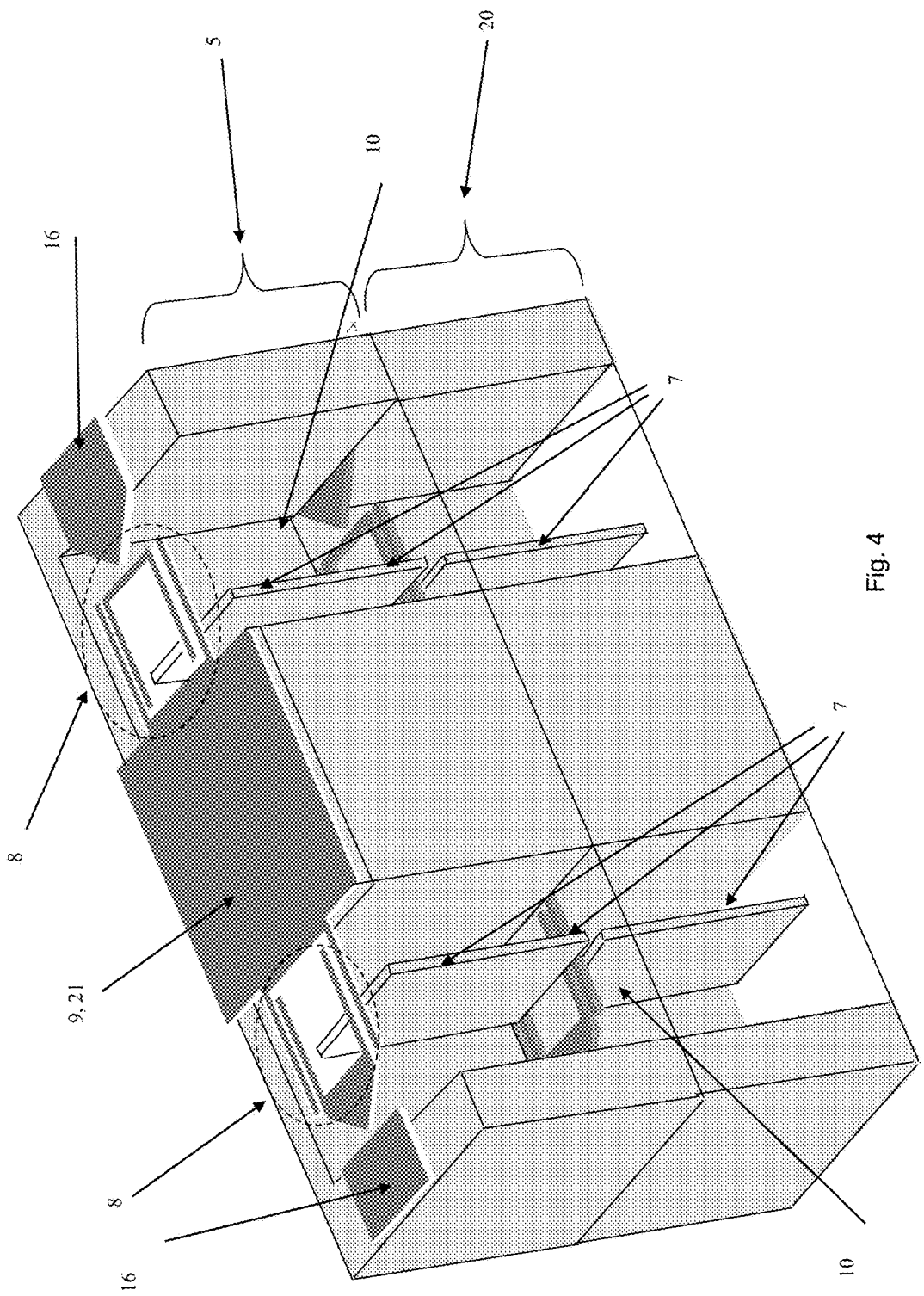
FIG. 4 shows the configuration of the resonator and the reflector.
Figure 7A:
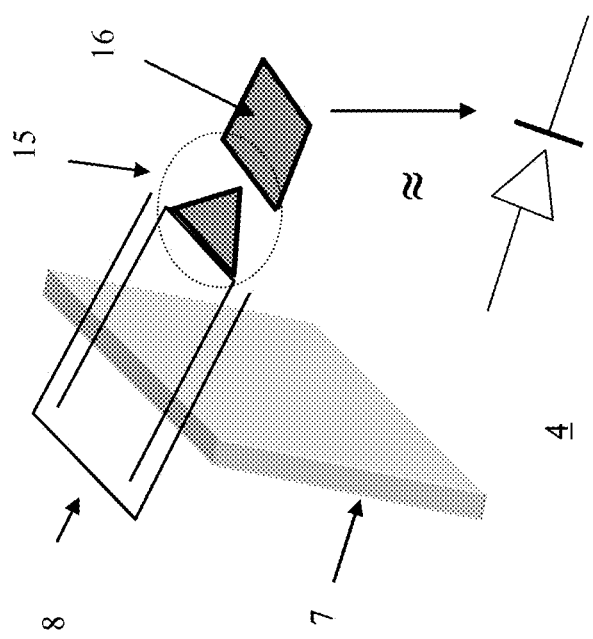
FIG. 7a shows a connection of the coupled conductors with the nonlinear component in a forward direction.
Figure 7B:
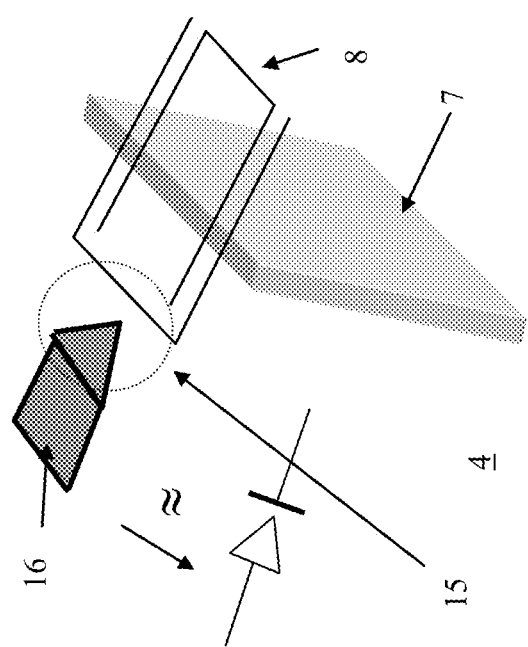
FIG. 7b shows a connection of the coupled conductors with the nonlinear component in a reverse direction.

The actual resonator 4 is described in FIGS. 4, 6a and 6b. In this embodiment, the first part 4a of the resonator 4 comprises of a first pair of electrodes in the form of first coupled conductors arranged in the incidence plane 3 on top of the first layer 5, and the second part 4b of the first resonator 4 is comprised of a first reflector 7 and a dielectric material 10a of the first resonator 4 within the first layer 5. The first reflector 7 is surrounded by the dielectric material 10a of the first resonator 4 within the first layer 5 of the dielectric structure. Furthermore, the first reflector 4 is arranged orthogonally to the incidence plane 3 of the first layer 5 of the dielectric structure. FIG. 5 shows the arrangement of the dielectric material 10 of the resonator 4 within the layered structure. The resonator 4 produces electric current or voltage, which is conducted by means of a nonlinear component 15 to a connecting component 16; this situation can be seen in FIGS. 7a and 7b, where both types of polarization of nonlinear component 15 are described.

Figure 8:
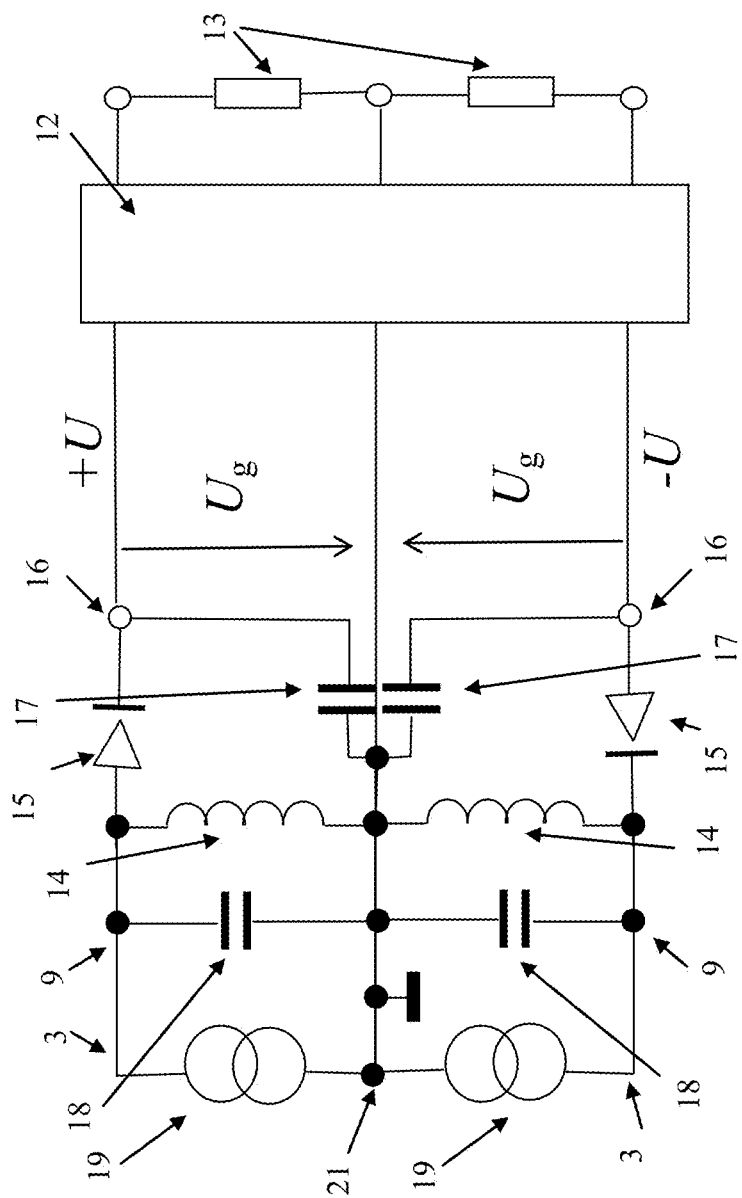
FIG. 8 shows an electrical equivalent diagram of the system and thus indicates its operation and structure by means of a circuit scheme equivalent to the actual structure of the system.

FIG. 8 show an electrical equivalent diagram of the system and explains thus its operation and structure by means of a circuit scheme equivalent to the actual structure of the system. The variants concerned are principally a one-way or two-way rectifier, a shaper, or a signal filter. These types of connections are widely known. A source 19 of alternating current or voltages caused by the induction from an electromagnetic wave is connected in parallel to a first capacitor 18 and an inductor 14, which in the connection are comprised of a condenser and a coil. These components then create a tuned alternating circuit, which is tuned to the characteristics and parameters of the incident electromagnetic wave and which resonates. The nonlinear component 15 shapes the signal on the resonant circuit; this signal is then filtered (rectified) to a further utilizable shape. As the next step, connection to a second capacitor 17 is realized; in the connection, the capacitor is comprised of a condenser. Also, in the connection, the connecting components 16 are indicated. These components 16 exhibit electric voltage +U, −U. If a selected electric impedance load 13 in the form of impedance Z is connected to the connecting components 16 (such as clamps), a variation in the resonant circuit occurs and the resonator may change its characteristics to such an extent that it will not be in a suitable resonance mode. Therefore, an electric circuit 12 is introduced before the electric impedance load 13. With any loading by electrical impedance Z on its output, this circuit will cause the situation when, on the output, the resonator with the nonlinear component 15 and the second capacitor 17 is loaded by one and the same value of impedance Zi, which will not change the set mode of the resonator.

Figure 2:
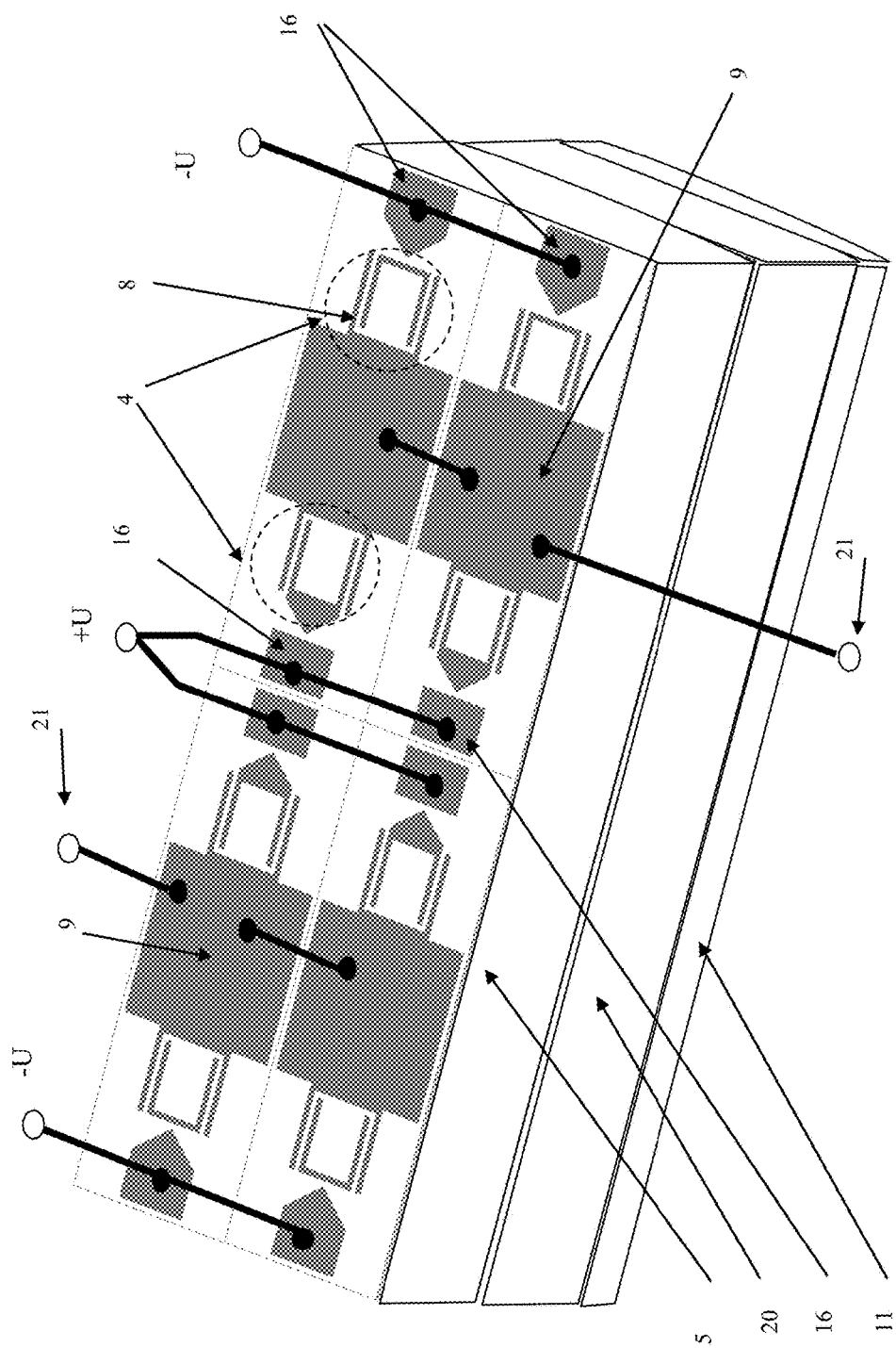
FIG. 2 illustrates an exemplary embodiment of the system including resonators and connecting components arranged on a dielectric structure and indicates the arrangement of another system for transforming energy tuned to a different frequency.

The function of the system, including a layered dielectric structure, is as follows: An electromagnetic wave 1 within the wavelength range of 100 nm to 100000 nm impinges at the wave impingement point 2 on the incidence plane 3 of the first layer 5 with minimum electromagnetic damping. The resonator 4 with the first resonance frequency is comprised in the first layer 5 and is periodically repeated also in individual second layers 20 with different resonance frequencies (as shown in FIG. 1 and FIG. 2). In the incidence plane 3 of the first layer 5 and within the structure of the first layer 5, at least one first resonator 4 is arranged. This resonator may operate individually or as an interconnection between the resonators, thus creating a field of periodically repeated solar elements. Along the incidence plane 3, the resonators 4 are connected in parallel or in series, with the formation of at least two resonators 4 on one solar element appearing to be an advantageous solution. These resonators are interconnected by means of a connecting component 9. The first resonator 4 in the first layer 5 is tuned to the first resonance frequency $f_1$ from the domain of the incident electromagnetic wave spectrum; following this layer, the second layer 20 with the second resonator 4 having the second resonance frequency $f_2$ is included in the direction of the propagation of electromagnetic wave. Thus, the progress occurs of up to hundreds or thousands of second layers 20 exhibiting different resonance frequencies $f_n$, creating the system for transforming energy of solar electromagnetic radiation into electric energy. Also, the resonance frequencies of $f_1$ to fn do not have to be repeated in the layers, and this rule ensures the maximum exploitation of energy of the incident electromagnetic wave.

An example of particular wavelengths is provided herein. The denominator denotes the particular wavelength in [m].

| Resonance frequency | Frequency [Hz] |
| --- | --- |
| $f_1$ | $3.10^8/1250.10^{-9}$ |
| $f_2$ | $3.10^8/1650.10^{-9}$ |
| $f_3$ | $3.10^8/1850.10^{-9}$ |
| $f_4$ | $3.10^8/2150.10^{-9}$ |
| $f_5$ | $3.10^8/2650.10^{-9}$ |
| $f_6$ | $3.10^8/3150.10^{-9}$ |

An electromagnetic wave 1 impinges at the wave impingement point 2 on the incidence plane 3. Here, the electric and magnetic components of the electromagnetic wave 1 decompose and form the maxima of intensities of the electric and magnetic fields. This process is realized due to the designed shape of the reflector 7, which can be a thin layer, a cuboid, a pyramid, a cone, a toroid, or a sphere, or a combination, part or intersection thereof. The surface of the reflector 7 may be formed by a layer of a dielectric material, metal, or a combination and shape variety of both (the components being part of the resonator 4). In order for the above-mentioned maxima of intensities to add up arithmetically (superpose) when a connection of two periodically repeated resonators 4 is realized, these resonators are connected via the connecting component 9 (as shown in FIG. 2). This figure shows an example of the proposed system where two resonators 4 are arranged along the incidence plane 3 of the first layer 5. These resonators 4 are periodically repeated and are interconnected by means of the connecting components 9.

Figure 3:
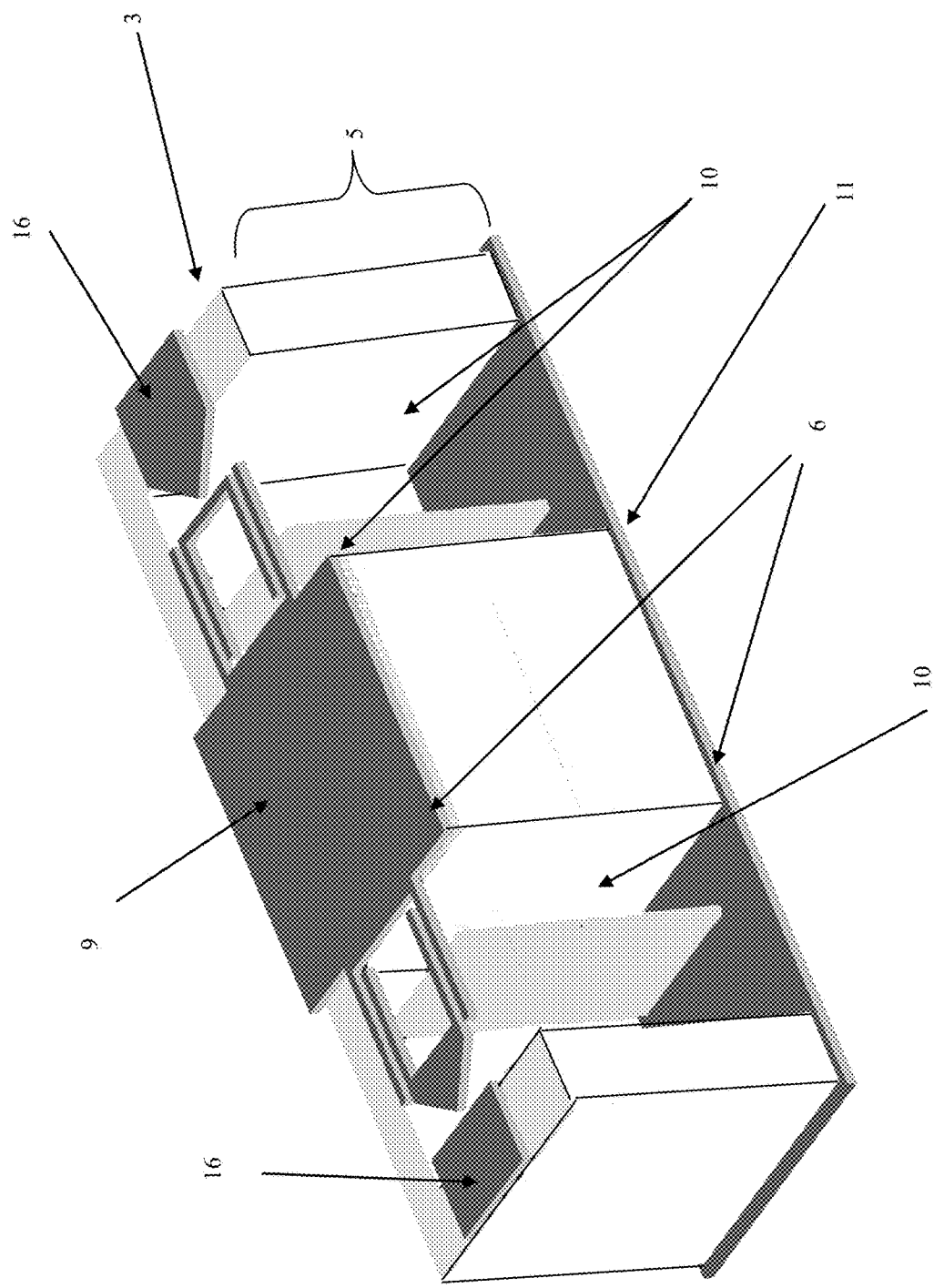
FIG. 3 shows a schematic view of the resonator arranged within the dielectric material.

In one embodiment of the system, as shown in FIG. 3, the resonator 4 is arranged in a layered dielectric structure and the first layer 5 of the dielectric structure is followed directly by the last layer 11. Mutual arrangement of individual parts of the system is shown in FIG. 4. The first resonator 4 comprises of two parts, wherein the first part 4a comprises of a pair of electrodes in the form of coupled conductors 8 and the second part 4b comprises of the first reflector 7 and the dielectric material 10a of the first resonator 4. The first resonator 4 is further embedded in the layered dielectric structure. The geometry of the system is designed in relation to the wavelength of the incident electromagnetic wave, namely in such a manner that the thickness of the dielectric structure will be at least ¼ of the wavelength of the lowest frequency of the incident electromagnetic radiation in free space. The proposed geometry design will ensure the resulting resonance characteristic and depends on the shape of resonator (dipole, split ring circle shape, split ring rectangle shape, patch, spot resonators).

After impinging on the incidence plane 3, the electromagnetic wave permeates through the layered dielectric structure. On the upper plane of the first layer 5, at the location of the incidence plane 3, the first part 4a of the first resonator(s) 4 is arranged, whereas the second part 4b extends within the first layer 5 with minimum electromagnetic damping (as illustrated in FIG. 3 or 4). The first layer 5 with minimum electromagnetic damping is instrumental towards setting the conditions of the maxima of electric and magnetic components in incidence plane 3 of the electromagnetic wave, and is measurable as the reflection coefficient is less than 0.5 from the interval of <−1,1>. In this respect, the layered dielectric structure is designed in such a manner that the progressing electromagnetic wave on the layered dielectric structure could couple and create a resonant area with the maximum resonance on the incidence plane 3. The first layer 5 with minimum electromagnetic damping may be equipped with a reference electrode 21. The electromagnetic wave further progresses behind the first layer 5 with minimum electromagnetic damping; the wave creates only a minimal reflected wave, the reflection coefficient is less than 0.5 from the interval of <−1,1>. The dimensions of the first layer 5 with minimum electromagnetic damping are selected to be equal to or greater than one quarter of the wavelength of the incident electromagnetic wave in relation to the relative permittivity of dielectric material 10 (for example, both layers may show the thickness of 10 µm for the selected type of material).

By achieving the resonant state, there occurs—in the at least one solar element within the group of periodically repeating elements that are ordered one after another in the direction of the incident electromagnetic wave—a multiple increase of amplitudes of the original incident electromagnetic wave; for the assumed wavelength of the electromagnetic wave 1 impinging on the incidence plane 3 of the first layer 5 of the dielectric structure, we can obtain an electric voltage applicable for further processing by the electric circuit 12 that manages the performance and mode of the layered structure designed for energy harvesting (energy exploitation, "power management").

A high-quality conductor or dielectric is applied as the material of conductive paths formed in the incidence plane 3, on which the first part 4a of the resonator 4 is arranged; the same high-quality conductor is also used for the material of coupled conductors 8, the connecting component 9, and the nonlinear component 15. The conductor exhibits different relative permittivity with respect to the relative permittivity of the first layer 5 with minimum electromagnetic damping. The first layer 5 with minimum electromagnetic damping is formed by a combination of the dielectric material 10 of the resonator and a conductive and/or semi-conductive material. The design of the resonator, its arrangement, and the selection of the materials were all realized in such a manner that, in the first layer 5 with minimum electromagnetic damping, the reflection coefficient is less than 0.5 from the interval of <−1,1>.

The designed dielectric structure of the system for transforming energy of solar electromagnetic radiation into electric energy operates in the resonant state, which enables us to advantageously obtain on the resonator 4 multiple (1-10000) values of amplitude of the electric component of the incident electromagnetic wave 1. The proposed periodic arrangement of the solar system facilitates operation in the resonant mode for frequencies f within the range of 0.1 THz to 5000 THz of the incident electromagnetic wave spectrum.

The solution known from prior art using antennas and standard resonant circuits usually achieves only the ratio of selective properties, and it is not possible to design this solution for the above-stated frequency range of the incident electromagnetic wave 1. The approach proposed herein, due to the application of a higher number of tuned elements in the entire photovoltaic/solar system, enables us to achieve energy transformation in the above-specified frequency range. This condition can be advantageously utilized for the design of an optimally layered dielectric structure and for approaching the ideal state of 100% exploitation rate, or transformation of the electromagnetic wave 1 incident on the elements to the generator output. Thus, the proposed approach can be applied to facilitate permanent use of the designed system characterized by high efficiency, operating life, and independence of thermal parameters of the realized systems.

A necessary prerequisite for the utilization of the system for transforming energy of solar electromagnetic radiation into electric energy (at the very minimum) as an electric energy source comprises in connecting the external electric circuit 12, which enables achievement of the state that, at any loading (external impedance load 13 assumes the values from the interval 0 to ∞ Ohms) of the circuit 12 output, the variation of external electric impedance load 13 on the input of the circuit 12 will not manifest itself. Thus, the basic component or group of components will remain in the resonant state.

The described system for transforming energy of solar electromagnetic radiation into electric energy can be utilized as a harvester or generator of electric energy, possibly also as a sensor or nonlinear converter. The advantage proposed by the presented solution comprises in its insensitivity to higher temperatures inside the area of the element, which is especially convenient for applications in energetics and within larger units.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

REFERENCE SIGNS 1. electromagnetic wave
2. wave impingement point
3. incidence plane
4. resonator
4a. first part of resonator 4
4b. second part of resonator 4
5. first layer of the dielectric structure
6. boundary of two layers
7. reflector
8. coupled conductors
9. connecting component of resonators 4
10. dielectric material of resonator 4
10a. dielectric material of the first resonator 4
10b. dielectric material of the second resonator 4
11. last layer of the dielectric structure
12. electric circuit
13. electric impedance load
14. inductor
15. nonlinear component
16. connecting component
17. second capacitor
18. first capacitor
19. source of current or voltage caused by induction from an electromagnetic wave
20. second layer of the dielectric structure
21. reference electrode

What is claimed is:

1. A system for transforming energy of solar electromagnetic radiation into electric energy, the system comprising:
    a dielectric structure comprising a plurality of layers and being permeable to an electromagnetic wave of the solar electromagnetic radiation;
    a first layer of the dielectric structure, comprising a first dielectric material with minimum electromagnetic damping having a relative permittivity in the range from 2 to 6, an upper plane of the first layer comprising an incidence plane of the electromagnetic wave onto the dielectric structure, wherein the depth of the first layer is equal to or greater than one quarter of the wavelength of the electromagnetic wave onto the dielectric structure;
    at least one first resonator, a first part of the first resonator extending along the upper plane of the first layer of the dielectric structure, and a second part of the first resonator extending within the first layer of the dielectric structure, the first resonator being tuned to a first resonance frequency;
    at least one second layer of the dielectric structure, coupled to the first layer of the dielectric structure in the direction of propagation of the electromagnetic wave to receive at least a portion of the electromagnetic wave having passed through the first layer of the dielectric structure, the second layer of the dielectric structure comprising a second dielectric material with minimum electromagnetic damping having a relative permittivity in the range from 2 to 6, wherein the depth of the second layer is equal to or greater than one quarter of the wavelength of the electromagnetic wave portion having passed through the first layer of the dielectric structure; and
    at least one second resonator, a first part of the second resonator extending along a plane between the first layer and the second layer of the dielectric structure, and a second part of the second resonator extending within the second layer of the dielectric structure, the second resonator being tuned to a second resonance frequency differing from the first resonance frequency.

2. The system according to claim 1, wherein the first part of the first resonator is constituted by a first pair of electrodes in the form of first coupled conductors arranged in the upper plane on top of the first layer of the dielectric structure, while the second part of the first resonator is constituted by a first reflector and the dielectric material of the first resonator, the first reflector being surrounded by the dielectric material of the first resonator within the first layer of the dielectric structure.

3. The system according to claim 2, wherein the first reflector is arranged orthogonally to the upper plane of the first layer of the dielectric structure.

4. The system according to claim 2, wherein the first part of the second resonator is constituted by a second pair of electrodes in the form of second coupled conductors arranged in the plane between the first layer and the second layer of the dielectric structure, while the second part of the second resonator is constituted by a second reflector and the dielectric material of the second resonator, the second reflector being surrounded by the dielectric material of the second resonator within the second layer of the dielectric structure.

5. The system according to claim 4, wherein the second reflector is arranged orthogonally to the plane between the first layer of the dielectric structure and the second layer of the dielectric structure.

6. The system according to claim 1, wherein the first resonance frequency of the first resonator corresponds to a first region of high power spectral density of the solar electromagnetic radiation, and the second resonance frequency of the second resonator corresponds to a second region of high power spectral density of the solar electromagnetic radiation.

7. The system according to claim 6, wherein the first resonance frequency is higher than the second resonance frequency.

8. The system according to any of the preceding claims, wherein the system further comprises a last layer of the dielectric structure, coupled to the at least one second layer of the dielectric structure in the direction of propagation of the electromagnetic wave to receive the remaining portion of the electromagnetic wave having passed through the preceding layers of the dielectric structure, the last layer of the dielectric structure comprising a last dielectric material with electromagnetic damping.

* * * * *